US012208636B2

(12) United States Patent
Chen et al.

(10) Patent No.: US 12,208,636 B2
(45) Date of Patent: Jan. 28, 2025

(54) MULTI-PURPOSE ACID-ETCHED METALLIC STAMPS AND DIES

(71) Applicants: Yong Jia Chen, Dongguan (CN); Earl Brohard, Groveland, CA (US)

(72) Inventors: Yong Jia Chen, Dongguan (CN); Earl Brohard, Groveland, CA (US)

( * ) Notice: Subject to any disclaimer, the term of this patent is extended or adjusted under 35 U.S.C. 154(b) by 218 days.

(21) Appl. No.: 18/066,865

(22) Filed: Dec. 15, 2022

(65) Prior Publication Data

US 2023/0118327 A1 Apr. 20, 2023

Related U.S. Application Data

(62) Division of application No. 17/505,970, filed on Oct. 20, 2021, now Pat. No. 11,602,945.

(60) Provisional application No. 63/204,791, filed on Oct. 22, 2020.

(51) Int. Cl.

| | |
|---|---|
| ***B41K 1/02*** | (2006.01) |
| ***B05D 1/04*** | (2006.01) |
| ***B41K 1/34*** | (2006.01) |
| ***B41K 1/38*** | (2006.01) |
| ***B44C 1/24*** | (2006.01) |
| ***C23F 1/02*** | (2006.01) |

(52) U.S. Cl.

CPC .................. *B41K 1/02* (2013.01); *B05D 1/04* (2013.01); *B41K 1/34* (2013.01); *B44C 1/24* (2013.01); *C23F 1/02* (2013.01); *B05D 2202/10* (2013.01); *B05D 2530/00* (2013.01)

(58) Field of Classification Search

CPC ... B41K 1/02; B41K 1/04; B41K 1/34; B41K 1/38; B44B 5/026; B44C 1/24; C23F 1/02

See application file for complete search history.

(56) References Cited

U.S. PATENT DOCUMENTS

| | | | | |
|---|---|---|---|---|
| 5,733,465 A * | 3/1998 | Kitamura | .................. | G03F 7/00 216/41 |
| 7,104,192 B1 * | 9/2006 | Corcoran | ................ | B44B 5/026 101/23 |
| 2006/0196327 A1 * | 9/2006 | Larsen | ...................... | B26F 1/44 83/13 |

FOREIGN PATENT DOCUMENTS

| | | | |
|---|---|---|---|
| EP | 3763499 | * | 1/2021 |

* cited by examiner

*Primary Examiner* — Christopher E Mahoney
*Assistant Examiner* — Marissa Ferguson-Samreth
(74) *Attorney, Agent, or Firm* — D'Ambrosio & Menon, PLLC; Usha Menon

(57) ABSTRACT

A metallic stamp and die for the craft industry comprises a predetermined acid-etched design on a surface of a metallic plate. A first layer of a metallic paint is applied over the front and back surfaces of the metallic stamp and die. A second layer of a rubber paint is applied over the metallic paint. The metallic paint facilitates bonding of the rubber paint to the metallic plate and increases the life of the coating of the rubber paint. The rubber paint is configured to absorb and store an ink and facilitate transfer of the ink to one or more substrates, thus enabling stamping of the design on the substrate. The metallic die can be configured for a plurality of uses, such as embossing, cutting, heat-foiling, stamping, scoring, and inserting patterns or designs in a plurality of substrates.

13 Claims, 12 Drawing Sheets

MULTI-PURPOSE ACID-ETCHED METALLIC STAMPS AND DIES

CROSS-REFERENCE TO RELATED APPLICATION

This application is a divisional of and claims priority from U.S. patent application Ser. No. 17/505,970 filed on Oct. 20, 2021, which claims priority to U.S. Provisional Patent Application Ser. No. 63/204,791 filed on Oct. 22, 2020, the entire disclosure of which is incorporated by reference herein.

FIELD OF INVENTION

The present disclosure generally relates to multi-purpose metallic stamps and dies for the hobby and craft industry.

BACKGROUND

The background description includes information that may be useful in understanding the present invention. It is not an admission that any of the information provided herein is prior art or relevant to the presently claimed invention, or that any publication specifically or implicitly referenced is prior art.

Craft and hobby (together "craft") enthusiasts use cutting dies and stamps for crafting, scrapbooking, card-making and other such purposes. Conventional craft stamps are made of rubber, plastic, or other polymers. Stamps are designed to imprint a one-dimensional image on a substrate. Dies can be used to cut shapes or images (also known as "fuzzy cut") by hand on a desired substrate. The substrate can include paper, card paper, fabric, chipboard, cardboard, cartons, labels, plastics, leather, wood, and other such materials.

Craft ink pads come in a variety of colors. Registration is a process by which a user can line up more than one color within a print so that all the colors can be registered precisely in the correct place on top of each other. Typically, to obtain optimal print registration, at least two steps are required. An ink pad with a desired color is first applied to the surface of a stamp having a desired image. An imprint of the stamped image is obtained on paper (or another desired substrate). A die (having a shape that matches the imprinted image) is placed over the imprinted image on the paper and then run through a roller die machine to create an impression. The designs can also be cut, a rubber mat laid over the cut design, and then run through a roller die cutting machine. This can create an embossed image of the cut design (rubber stamps cannot be used to emboss images). Dies can also be used to transfer a foil design to a substrate. This process involves hot foiling or hot stamping using heat, pressure, and photoetched and/or engraved dies to transfer the foil design to the substrate.

Users of conventional stamps require dexterity, and they have to be careful when using the stamps to obtain a crisp pressed image on a substrate. Users of customary stamps can spend several hours cutting and inking the die only for the colors to be misaligned and the final print to appear sub-optimal (known as the "off-registration problem"). There is a need for stamping/cutting dies that can solve this off-registration problem. Additionally, there is a need for dies that can serve multiple functions or purposes.

SUMMARY

The present invention comprises a multi-purpose or multi-functional (both terms used interchangeably hereinafter) metallic stamp and die (hereinafter referred to interchangeably as "metallic stamp and die" or "metallic die") for use in the craft industry. The metallic stamp and die of the invention advantageously combines the function of conventional stamps and dies into one single apparatus. The metallic stamp and die can be configured for a plurality of uses. For example, the metallic die can be used for at least two purposes, such as, embossing, cutting, heat-foiling, stamping, scoring, and inserting patterns or designs to a plurality of substrates.

In an embodiment, the metallic stamp and die may be made of a ferrous metal or a ferrous alloy. In an embodiment, the metallic stamp and die is made of carbon steel. A predetermined or desired design can be etched onto a surface of the metallic plate. For instance, the surface of the metallic plate can be subjected to a flow of an acid that reacts with the material of the metallic plate to corrode its surface and create the desired raised or three-dimensional design patterns on the metallic plate.

In an embodiment, the metallic stamp and die can include a two-layer coating over the etched design. The two-layer coating may include an inner layer of a metallic paint and an outer layer of a soft rubber paint. The inner layer of metallic paint may be configured to facilitate the bonding of the rubber paint to the metallic die. The rubber paint is configured to absorb and store an ink and facilitate a transfer of the ink to the substrates, thus enabling stamping of the design on the substrate.

The rubber paint may include: a resin, such as but not limited to CAS No. 201058-08-4; N-butyl acetate, such as but not limited to CAS No. 123-86-4; and 4-Methyl-2-pentanone, such as but not limited to CAS No. 108-10-1.

The metallic paint may include: N-butyl acetate, such as but not limited to CAS No. 123-86-4; cellulose; acetate butanoate, such as but not limited to CAS No. 9004-36-8; and a resin, such as but not limited to CAS No. 201058-08-4.

Another embodiment of the present invention relates to a multi-purpose die assembly (also referred to simply as die assembly and the two terms used interchangeably hereinafter) for the hobby and craft industry that incorporates the disclosed metallic acid-etched stamp and die. The multi-purpose die assembly includes a metal die base having a cavity and one or more inserts configured to be positioned in the cavity. The one or more die inserts include at least one metallic stamp and die having a predetermined design etched thereon. The metallic stamp and die is configured to carry out a combination of two or more operations selected from: embossing, cutting, heat-foiling, stamping, scoring, and inserting patterns or designs on a plurality of substrates.

The die assembly may further include a cutting blade configured with the die base.

The die assembly may include two or more metallic stamps and dies that may be inked with ink pads (that have inks of a desired color) to stamp a multi-color design on the substrate.

Another embodiment of the present invention relates to a method for making a metallic stamp and die for the hobby and craft industry. The method includes the steps of: (i) providing a metallic plate; (ii) transferring a predetermined design to a surface of the metallic plate; (iii) exposing the surface of the metallic plate to a flow of an acid till the transferred design is etched on the surface; and (iv) providing a two-layer coating over the etched design. The two-layer coating includes an inner layer of a metallic paint and an outer layer of a rubber paint. The metallic paint can facilitate bonding of the rubber paint to the metallic plate, and the rubber paint is configured to absorb and store an ink and facilitate the transfer of the ink to a substrate. The metallic stamp and die is configured to carry out a combination of two or more operations selected from: embossing, cutting, heat-foiling, stamping, scoring, and inserting patterns or designs on a plurality of substrates.

The method may further include the step of electrostatic spraying first a layer of the metallic paint and thereafter a layer of the rubber paint on the metallic plate by an electrostatic spraying process. This is followed by curing the layers of the sprayed paints at a predetermined elevated temperature for a selected time period.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, explain the principles of the present disclosure.

DETAILED DESCRIPTION

Figure 1A:
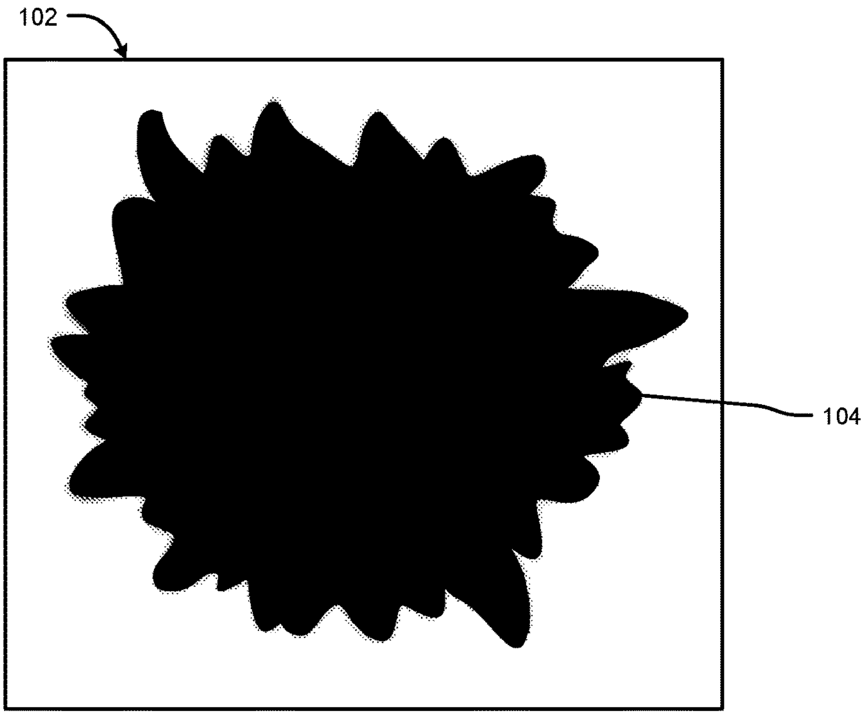
FIG. 1A illustrates an exemplary image of a metal die base of the disclosed multi-purpose die assembly for the hobby and craft industry, in accordance with embodiments of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined below, it should be given the broadest definition persons in the pertinent art have given that term as reflected in printed publications and issued patents at the time of filing.

According to an embodiment, the present invention involves manufacturing a multi-functional craft die entirely from an acid-etched metal. The multi-functional craft die combines at least four separate conventional dies. It saves the user time and money by incorporating five design applications into one product. It can, therefore, make a crafter more productive as there is only one step to choose a project instead of five.

Currently, if an image is rubber-stamped on a medium, such as paper, it cannot also be embossed. Also, if the stamped image has to be "cut out," the user will need to use a pair of scissors or purchase a separate cutting die that has the same dimensions as the stamped image. The acid-etched metallic stamps and dies of the present invention allow a crafter/craftsperson to carry out multiple functions, namely: (i) cut; (ii) stamp; (iii) emboss; (iv) design a score line to create a fold; (v) heat foil stamp; and (vi) create a design with interchangeable or insertable images/patterns, or combinations of the same. These functions can be carried out in a single step without the need for any additional steps, or separate stamps, dies, cutting dies, or scissors. The acid-etched metallic stamps and dies include a novel coating that is configured to work with a variety of pigments and inks, including, alcohol inks.

An image that is rubber-stamped on paper cannot be embossed. If the stamped image has to be cut out, it will require the use of a pair of scissors or the further purchase of a cutting die having the same dimensions as the stamped image. Advantageously, in one embodiment, the metallic stamp and die (or "metallic die") of the invention can be configured for cutting, stamping, and embossing. Since all these features can be performed using a single metallic die of the invention, it changes card craft stamping, cutting and embossing into one simple process. In another embodiment, the metallic die can be configured to cut, emboss, and hot foil stamp. In yet another embodiment, the metallic die can be configured to emboss, stamp, and design a score line to create a fold. In another embodiment, the metallic die can be configured to have an interchangeable design or insertable images.

The metallic die is etched with an acid. While conventional rubber/polymer stamps/dies can only be used to create simple line images, acid etching allows the metallic die to be used to create lines and embossed dimensions. Acid etching can be carried out by flowing an acid over a metallic plate. The acid can include ferric chloride, hydrochloric acid, nitric acid, sulfuric acid or any other suitable acid. The acid-etched cut lines are designed to cutout patterns on craft paper and layer over colors for colorful patterns. Acid etching also facilitates the creation of novel “stamp press” embossed images to paper, fabric, and other substrates/materials, such as, metal (which cannot be handled by conventional rubber stamps). Thus, acid etching facilitates the delivery of fine images that will last for years.

Conventional dies have been made to match the shape of a stamped image. However, it is not always possible to evenly line up the die on both sides of the image. The metallic die of the present invention is configured to overcome these shortcomings, including the off-registration problem by providing a two-layer coating that can ensure that the ink is held at the right/desired position/spot in the metallic die to obtain a clean and crisp pressed image on paper or other substrates. The coating can hold pigment inks and alcohol inks. The coating applied to the surface of the die can also be used with dye inks and oil-based inks. The coated metallic die of the present invention allows stamped inks on the substrate to leave an impression in color and for shapes to be perfectly cut out around the design.

According to an embodiment, the coating includes at least two distinct layers. A bottom or inner coating layer includes a metallic paint, and a top or outer coating layer is a rubber paint. The bottom metallic paint coating layer facilitates strong bonding between the metallic die and the rubber paint. The top rubber paint coating layer is ink-friendly, soft, and has the function of ink storage. This top coating layer of rubber paint is absorbent to ink and can facilitate the transfer of ink to paper and other substrates.

In one embodiment, the metallic paint coating includes N-butyl acetate (CAS No. 123-86-4); cellulose; acetate butanoate (CAS No. 9004-36-8); and a resin (CAS No. 201058-08-4). The rubber pain coating includes a resin (CAS No. 201058-08-4); N-butyl acetate (CAS No. 123-86-4); and 4-Methyl-2-pentanone (CAS No. 108-10-1).

According to an embodiment, a method of preparing the metallic die involves the steps of initially applying a desired artwork/image to a metallic plate or sheet. The metallic plate can be made of, but not limited to carbon steel. Other suitable materials, such as aluminum, which can be etched by a reaction with an acid, are well within the scope of the present invention. The metallic plate can then be subjected to acid etching by allowing a controlled flow of acid over the metal plate. A first coating (or bottom or inner coating) comprising a layer of metallic paint is applied to the front and back surfaces of the acid-etched metallic plate. This is followed by applying a second coating (or top or outer coating) of a rubber paint over the metallic paint. The coatings can be applied by air spraying or electrostatic spraying and then cured at an elevated temperature for a predetermined duration or time period. In one embodiment, both the bottom and top layers of coating are sprayed and then the metallic plate is baked. Alternatively, the two coatings can be cured individually, i.e., the metal paint can be cured before spraying the rubber paint. The electrostatic spray process ensures that an even coat is applied to the surface of the metallic die. That is, it ensures that the thickness and evenness of the coating are consistent.

The acid etching process will not affect the coating application. However, it will determine how the embossed/ink image turns out on paper, such as, the depth and crispness of the design on paper. If the die is not etched deep enough, when inking the die, the ink will smear the die base, which will make the stamped image blurry or not crisp.

The present invention not only replaces customary stamps, such as rubber stamps or clear stamps, it can also leave more crisp images on paper than plastic stamps. Additionally, the present invention has wider usage than stamps since stamping, embossing, and cutting can be done in one pass.

According to an embodiment, a multi-purpose die assembly for the hobby and craft industry is disclosed, which incorporates the disclosed metallic acid-etched dies. The multi-purpose die assembly includes a metal die base with a cavity and one or more die inserts configured to be positioned in the cavity in the die base. The die inserts can include more than one metallic die having a design etched thereon. Each of the more than one metallic dies may be inked with inks of different colors to stamp a multi-color design on the substrate in a single step in combination with other operations selected from: embossing, cutting, heat-foiling, stamping, scoring, and inserting patterns or designs in a plurality of substrates.

According to an embodiment, a method of using the metallic die involves applying ink across the surface of the metallic die. Then the paper can be placed on the die before being sandwiched between appropriate mats. This is passed through the pressing machine to obtain a crisp image. For a deeper embossed image on paper, a rubber mat can be added on the back of the paper then passed through a pressing machine to get a deeper impression on the paper. The metallic die can also be used as a hot foiling die which can conduct heat to make the foil release from the vinyl film and transfer to the paper.

Thus, the metallic dies can be used for multiple purposes. The application of proprietary coating allows the application of inks for imprinting color images. The same finish can be used to hot foil images.

The metallic die of the present invention is configured to last many years unlike conventional rubber and polymer stamps and dies. The metallic dies can be used in paper crafting, scrapbooking, and other art activities. The metallic dies can also be used in home décor illustrations which involve stamping and embossing similar to letter pressing.

Figure 1B:
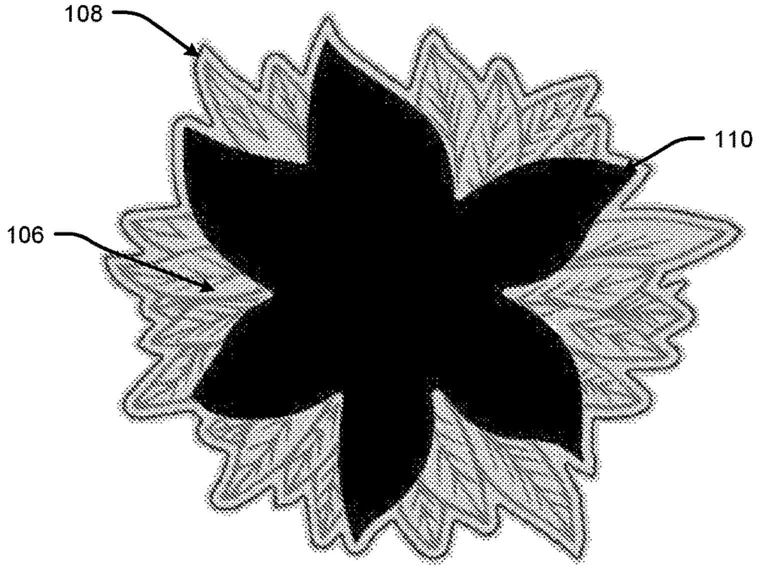
FIGS. 1B and 1C illustrate exemplary images of acid-etched metallic stamps and dies used as inserts to be assembled with the metal die base of FIG. 1A, in accordance with embodiments of the present disclosure.

FIG. 1A illustrates an exemplary metal die base 102 of a multi-purpose or multi-functional die assembly capable of producing multi-color craftwork. The die assembly has a cavity 104. The cavity 104 may be configured to receive or hold suitably shaped die inserts. FIG. 1B illustrates an exemplary acid-etched metallic die used as an insert to be assembled within the cavity 104. As shown in FIG. 1B, the die insert 106 contains a cavity 110. The cavity 110 may be further configured to receive/hold a suitably shaped die insert, such as, die insert 112 illustrated in FIG. 1C. The exemplary metallic die 106 in FIG. 1B can also include a cutting blade 108 located around an outer periphery. FIG. 1D illustrates a die assembly 100 with the die inserts 106, 112 of FIGS. 1B-1C positioned within the cavity 104 of the metal die base of FIG. 1A.

Figure 1C:
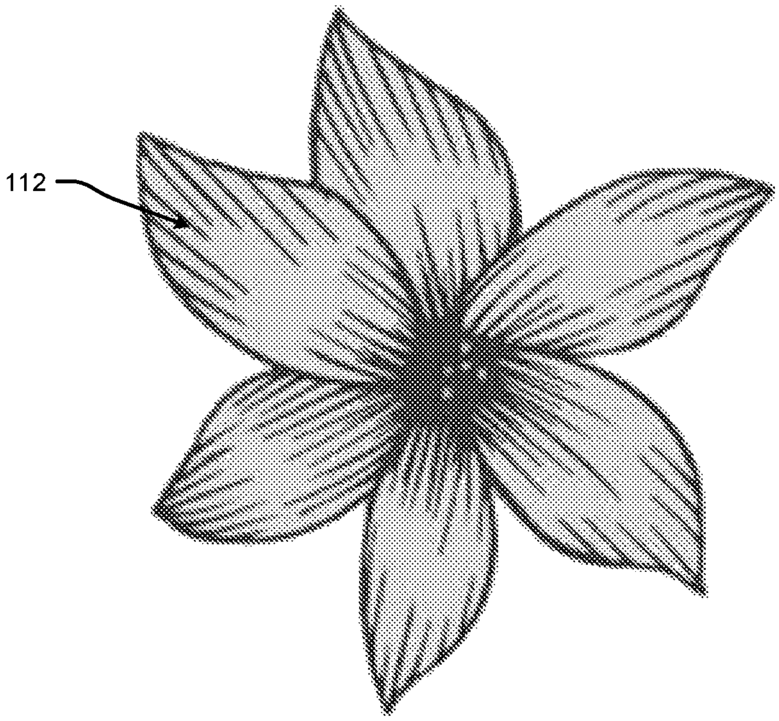
Figure 1D:
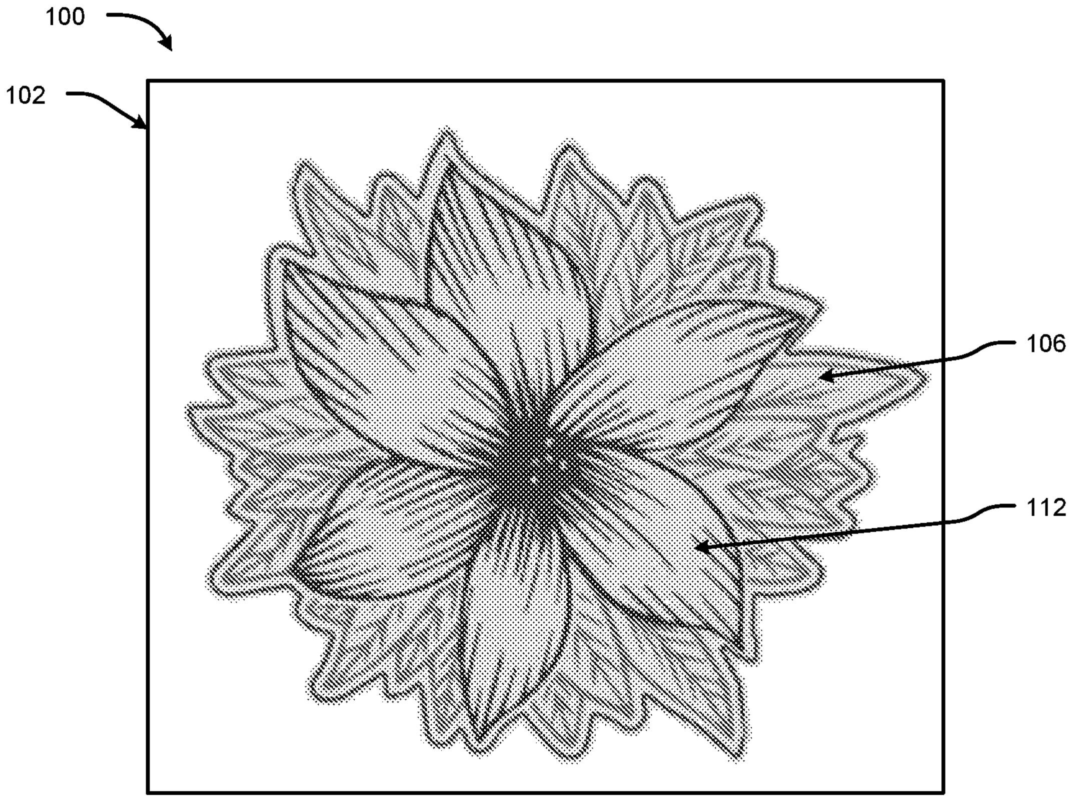
FIG. 1D illustrates an exemplary image of a multi-functional die assembly with acid-etched metallic stamp and die inserts of FIGS. 1A and 1B positioned within a cavity of the metal die base of FIG. 1A, in accordance with embodiments of the present disclosure.
Figure 2A:
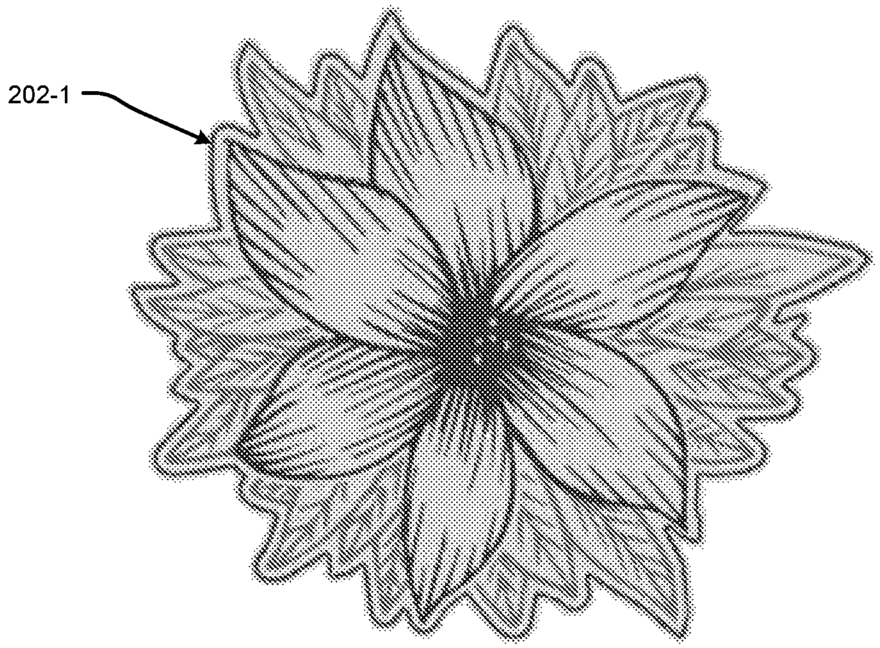
FIGS. 2A and 2B illustrate exemplary multi-colored images of craftwork produced using multi-purpose acid-etched metallic stamps and dies, in accordance with embodiments of the present disclosure.
Figure 2B:

As shown in FIGS. 1B and 1C, the surface of the metallic die inserts 106 and 112 have acid-etched surfaces which facilitate the creation of a custom/desired design pattern. The metallic die inserts 106 and 112 have a coating of a soft rubber paint that facilitates the absorption of ink and/or a two-layer coating including a first coating of a metallic paint and a second coating of a rubber paint. Thus, if the die assembly 100 is assembled with the metallic dies 106 and 112 and inked with inks of different colors and used for craft work on a substrate, the substrate can be stamped and embossed with a multicolored image that replicates the acid-etched design pattern on the metallic dies 106 and 112. Additionally, the cutting blade 108 can be used to cut the substrate to thereby produce a multi-color (identified by lines of different thickness) craftwork 202-1 shown in FIG. 2A. FIG. 2B shows another exemplary multi-color craft work 202-2 having different colors (identified by lines of different thickness).

Figure 3A:
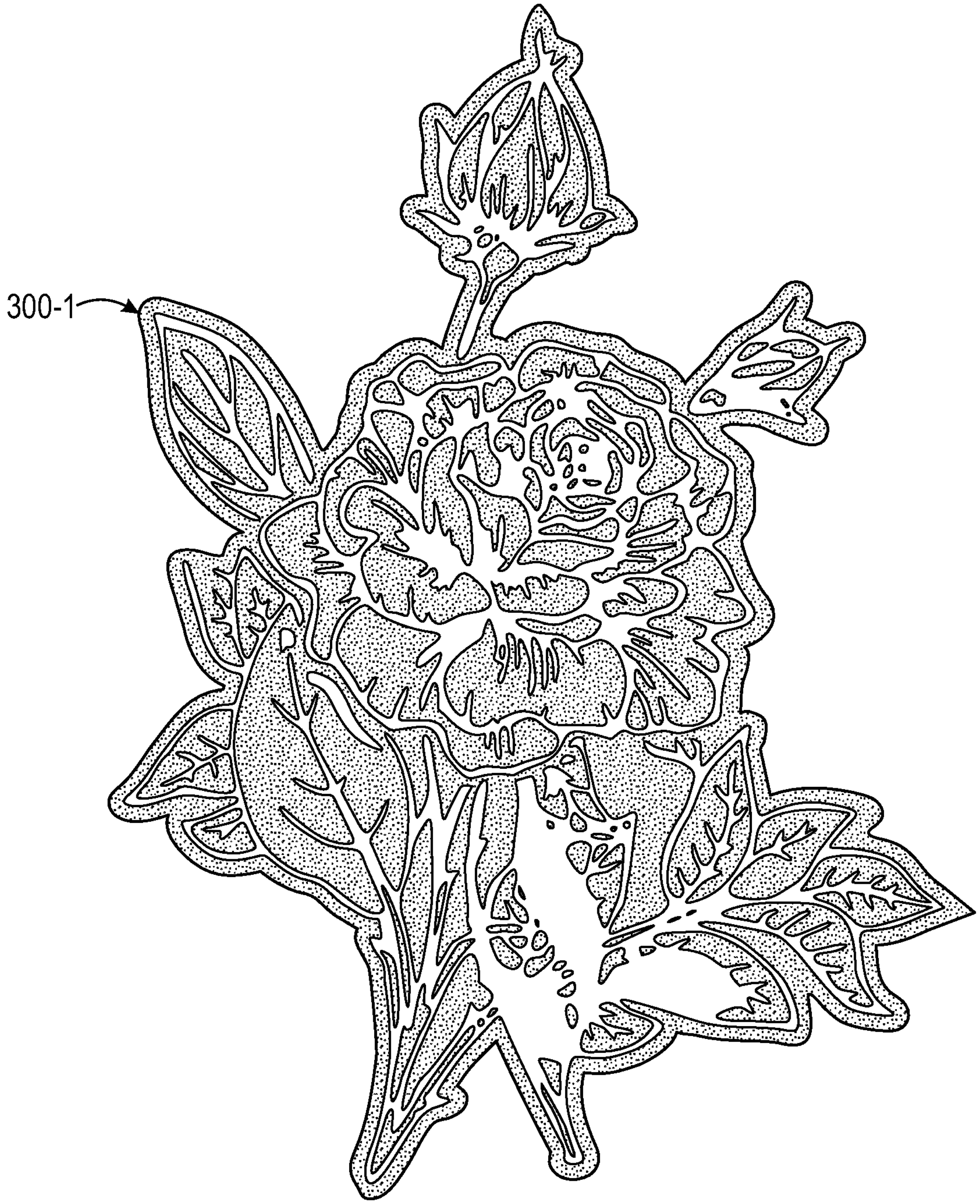
FIGS. 3A to 3C illustrate exemplary acid-etched metallic stamps and dies for embossing, stamping, and cutting, in accordance with embodiments of the present disclosure.
Figure 3B:
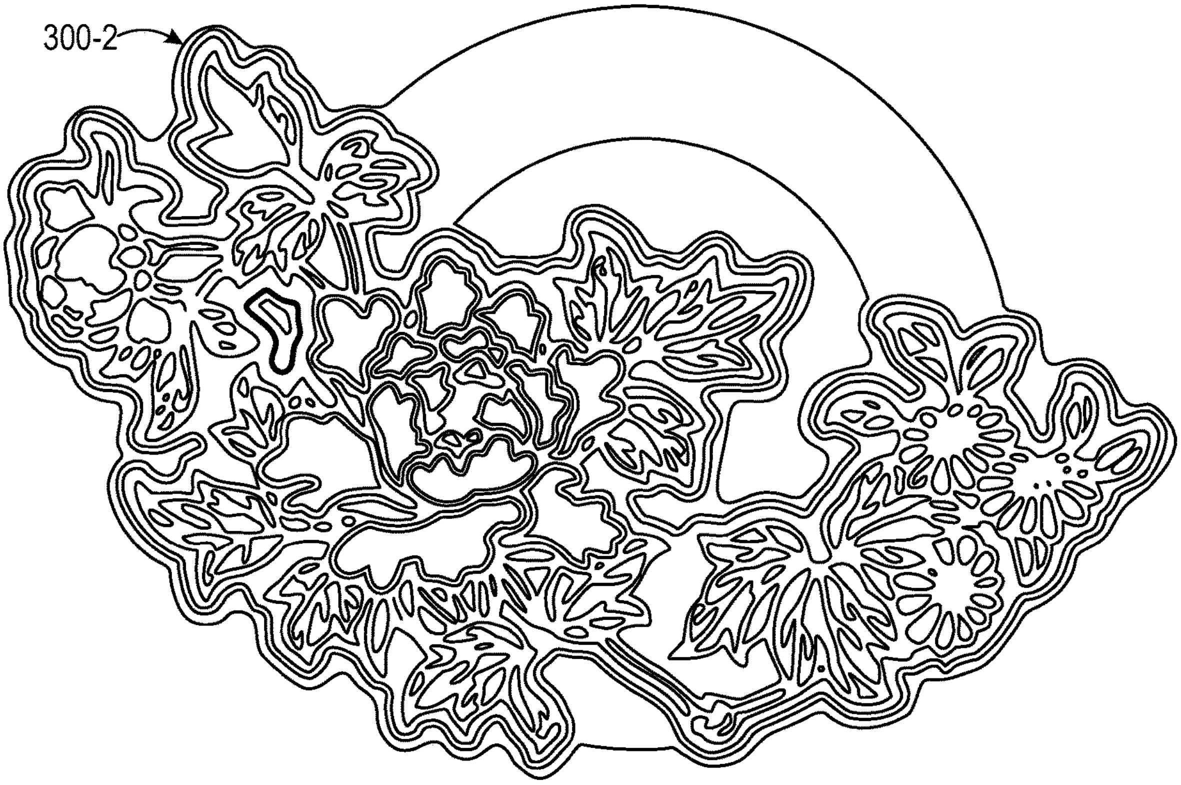
Figure 3C:
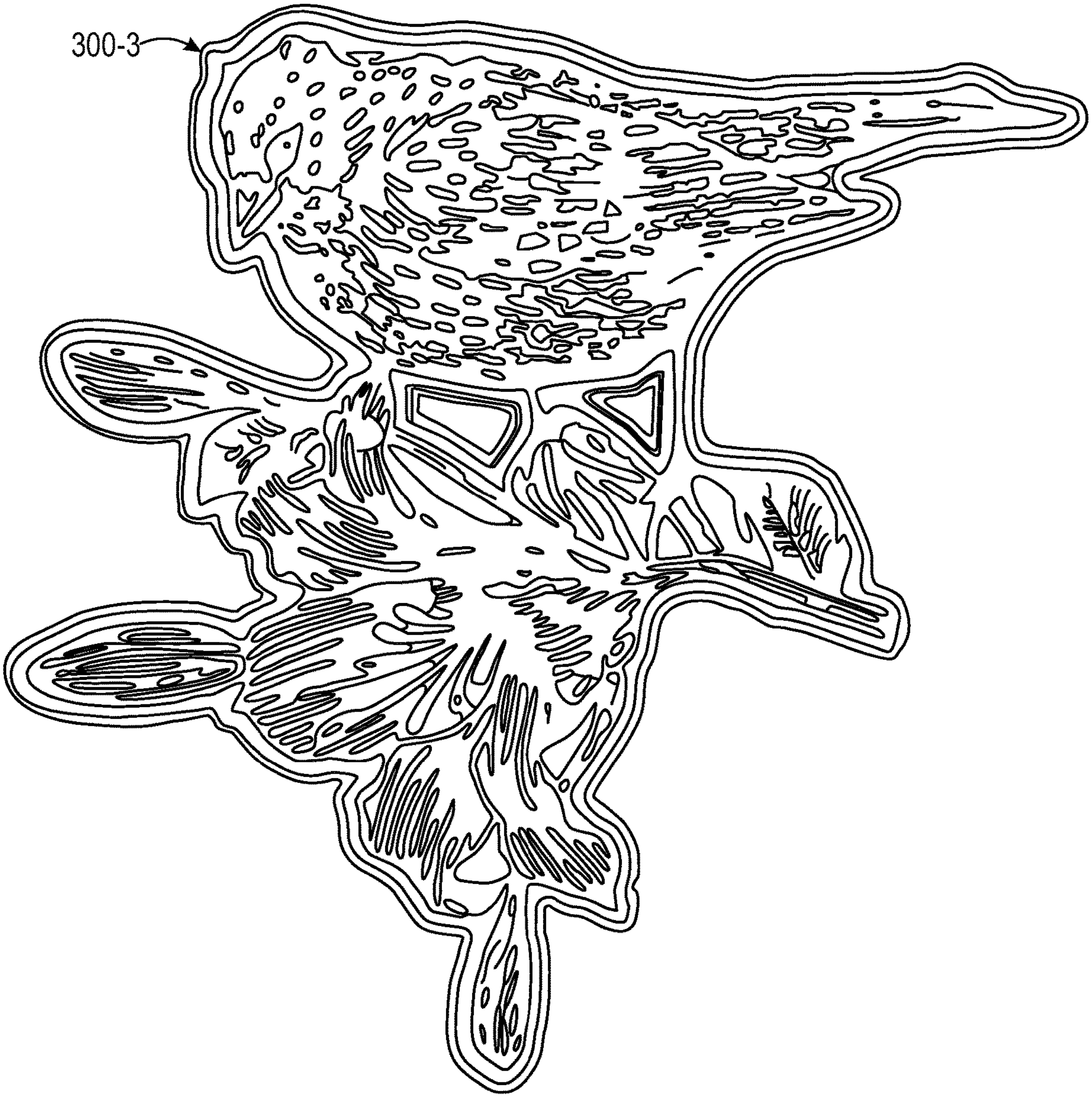

FIGS. 3A to 3C illustrate some exemplary metallic dies 300-1, 300-2, and 300-3 (hereinafter collectively referred to as metallic dies 300), which have different design patterns acid-etched on them. It is to be appreciated that the metallic dies shown in FIGS. 1B, 1C, and 3A to 3C are exemplary and the metallic dies can be customized to meet the user requirements with any other designs, shapes, and sizes.

Each of these metallic dies 300 can be made from a metal plate by acid-etching after the required design has been transferred to a surface of the metal plate. The front and back surfaces of the metallic die can then be coated with two layers of coatings that include an inner layer of a metallic paint and an outer layer of a rubber paint that absorbs ink and facilitates the transfer of the ink to the substrate during stamping. Thus, the metallic dies 300 can stamp and emboss the corresponding design pattern on a substrate after they have been inked with an ink of a desired color. In addition, the acid-etched design pattern can also be heat foiled on the substrate by adopting known processes.

Figure 4A:
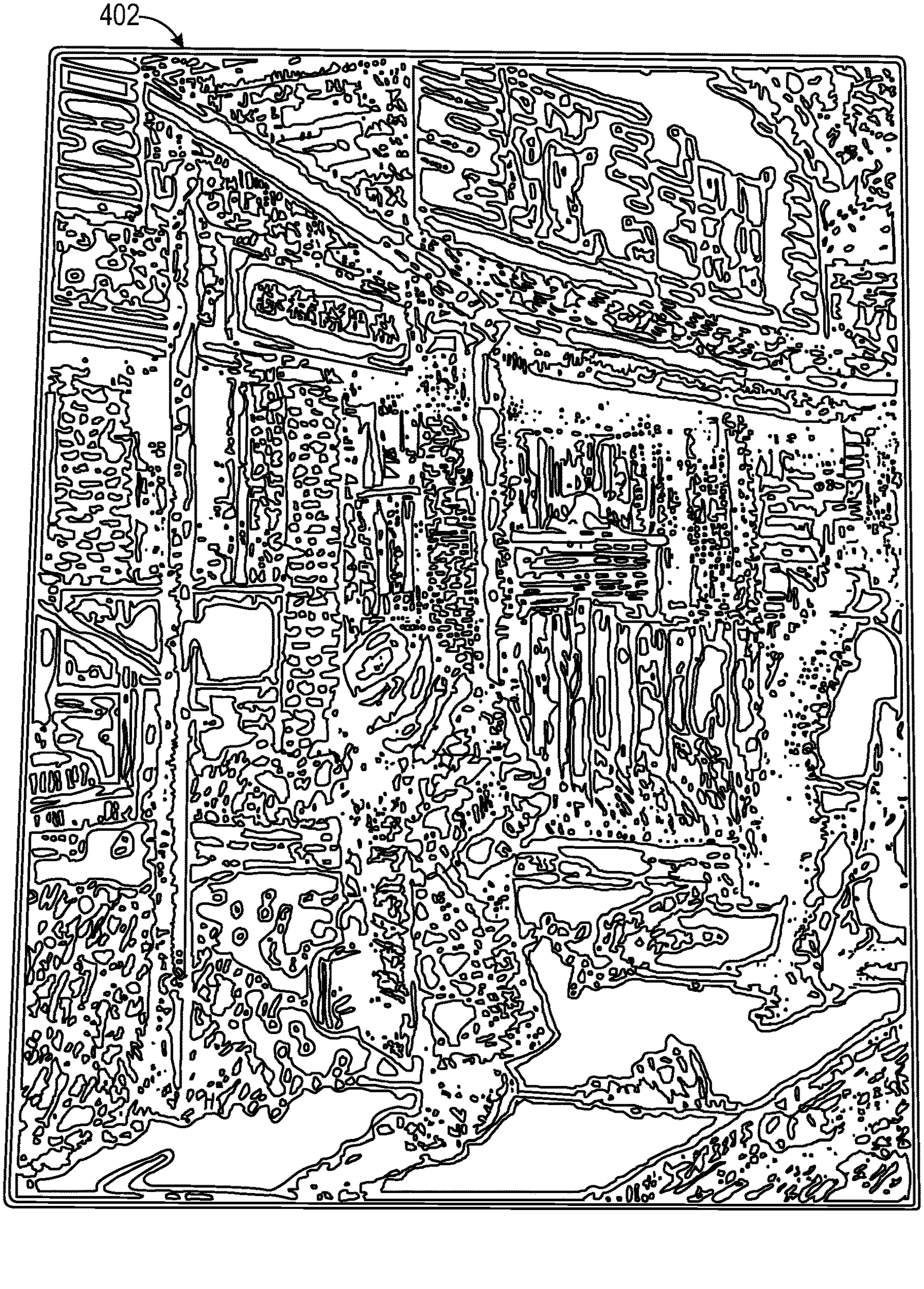
FIGS. 4A and 4B respectively illustrate an exemplary A2-sized embossing and stamping image die and an embossed image produced using the same, in accordance with embodiments of the present disclosure.
Figure 4B:
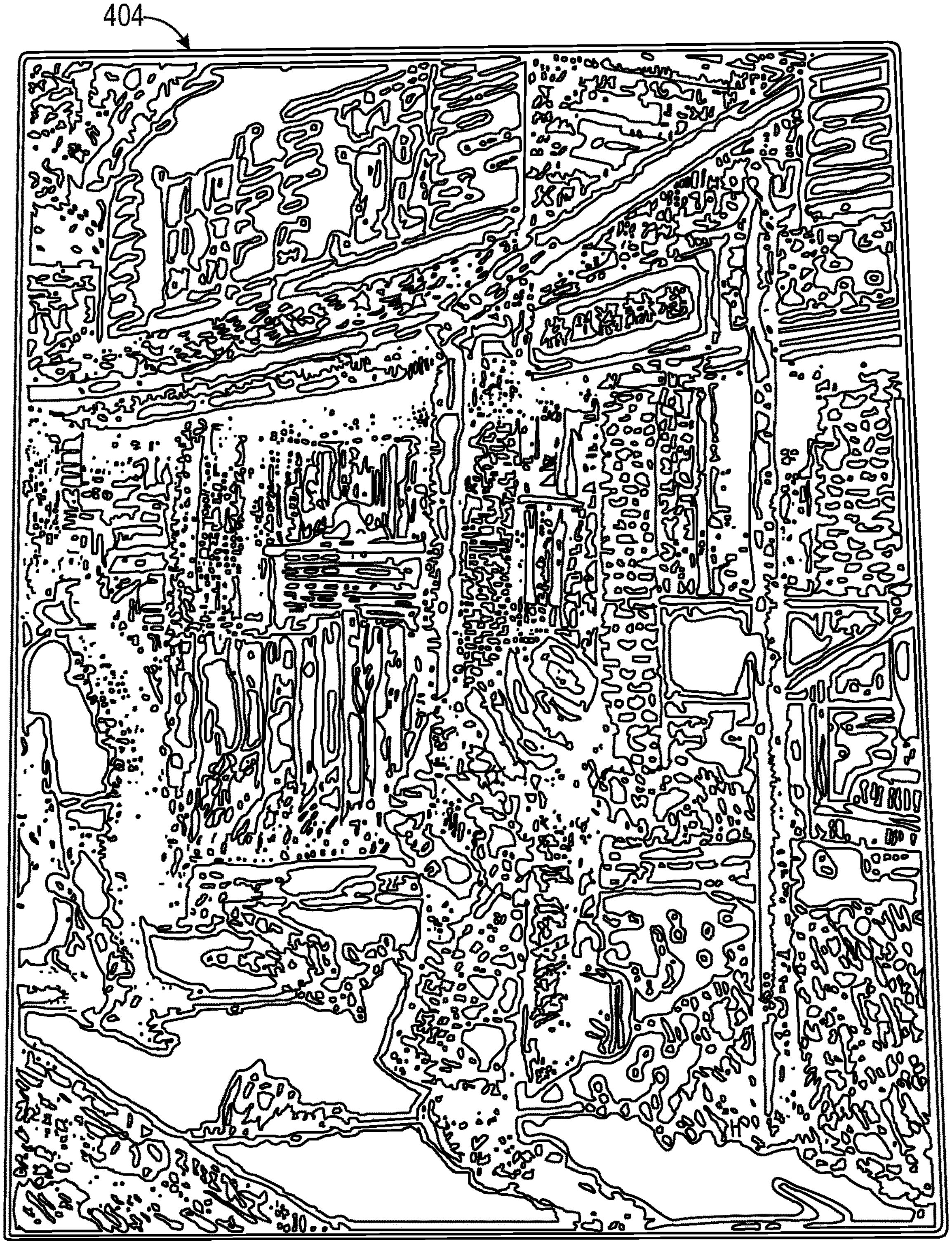

FIG. 4A illustrates an exemplary A2 size embossing and stamping image die 402. The embossing and stamping image die 402 produces the image 404 shown in FIG. 4B when pressed onto the substrate. The embossing and stamping image die 402 can be made by acid-etching a metal plate and thereafter coating the surface with either a soft rubber paint or with a two-layer coating (including a metallic paint and a rubber paint) described earlier.

Figure 5A:
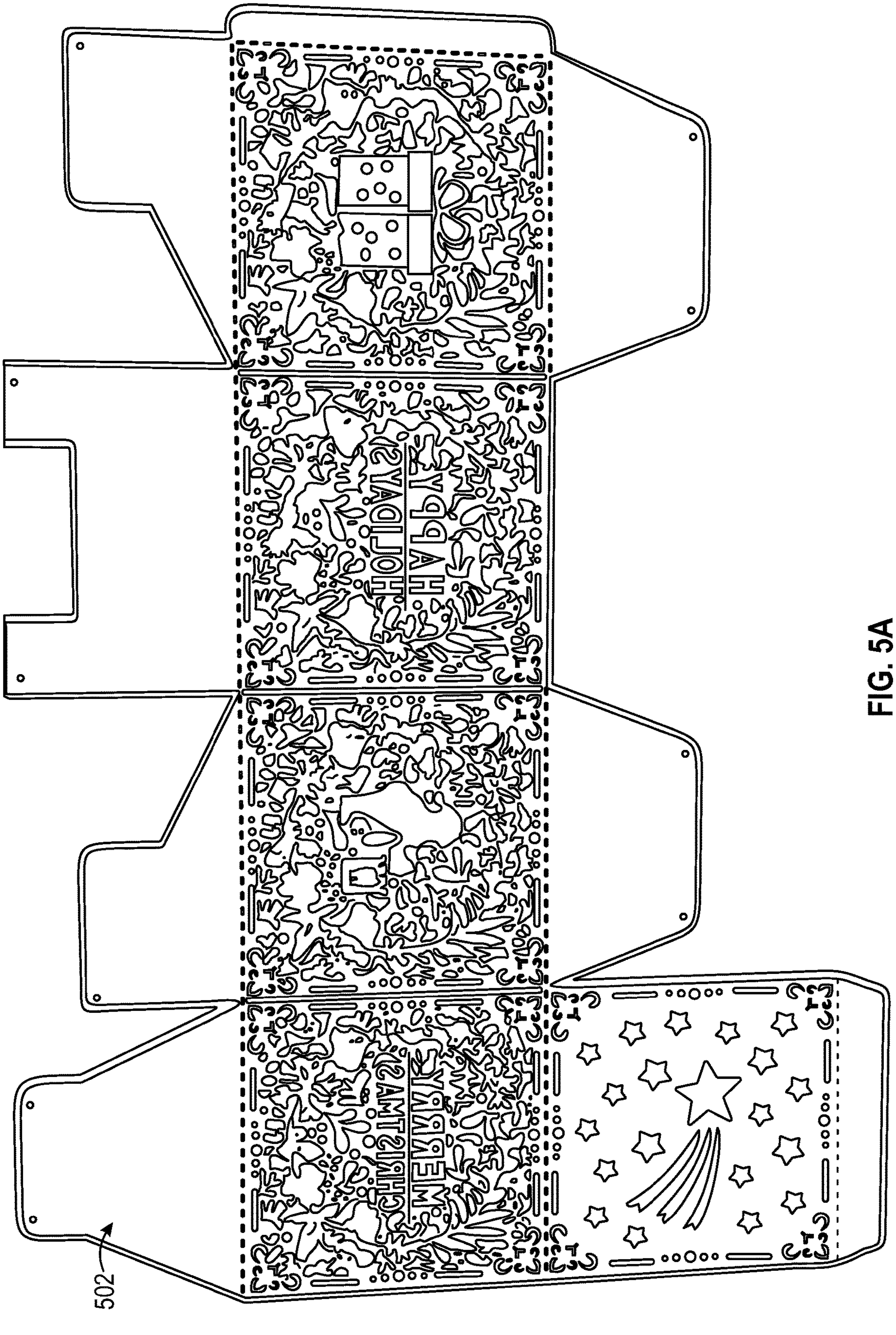
FIGS. 5A and 5B respectively illustrate an exemplary scoring die and a scored card paper produced using the same, in accordance with embodiments of the present disclosure.
Figure 5B:
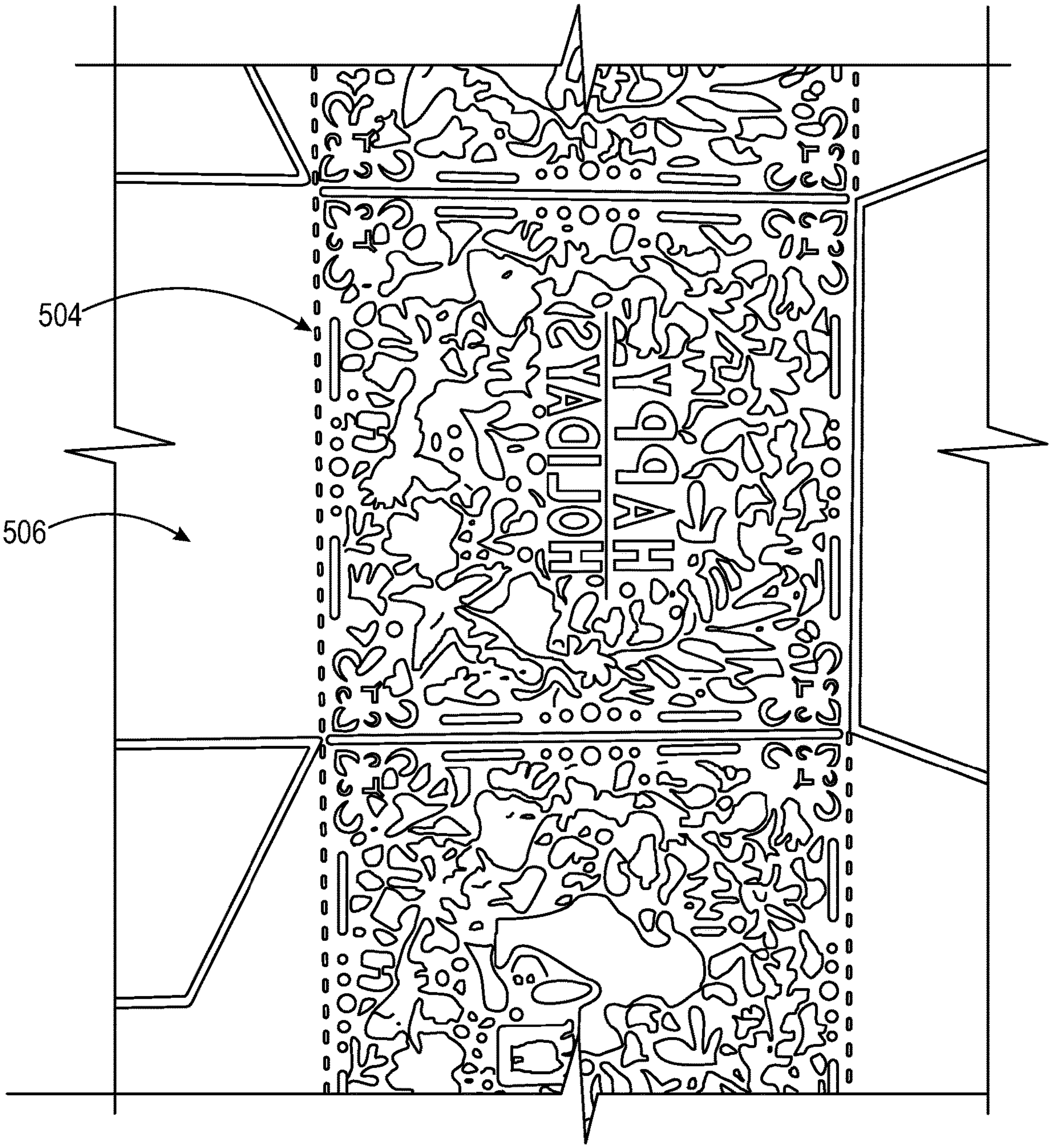

FIG. 5A illustrates an exemplary scoring die 502 produced using the above-described process. When scoring die 502 is pressed onto paper, it produces a scored paper card 506 with score lines 504 to fold the paper, shown in FIG. B.

Figure 6:
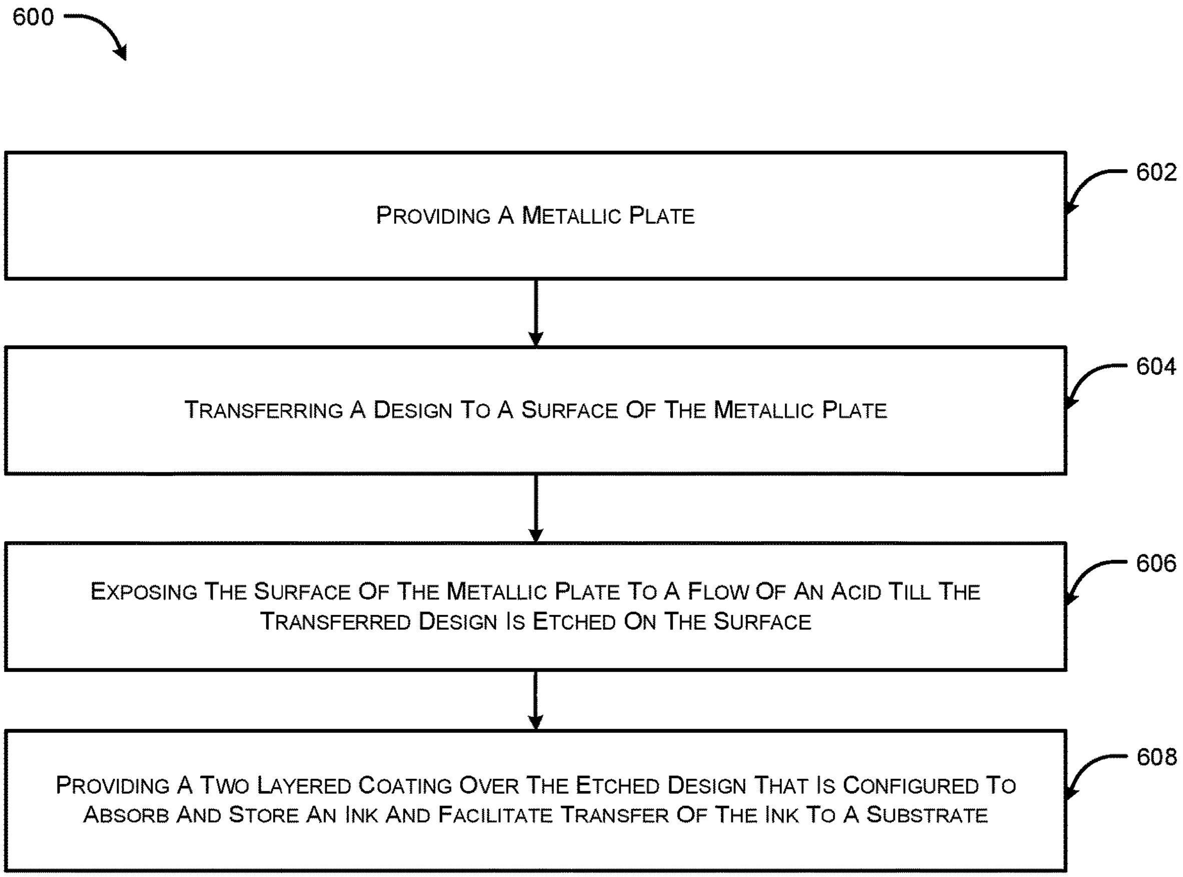
FIG. 6 illustrates an exemplary flow diagram for manufacturing the disclosed multi-purpose acid-etched metallic dies for the hobby and craft industry, in accordance with embodiments of the present disclosure.

FIG. 6 illustrates an exemplary flow diagram for producing the disclosed multi-purpose acid-etched metallic dies for the hobby and craft industry. The method 600 is for producing acid-etched metallic dies, such as, metallic dies 106, 112, and 300 as shown in FIGS. 1B, 1C, and 3A-3C, respectively. As shown in FIG. 6, the method 600 can include at step 602, providing a metallic plate, such as but not limited to a carbon steel plate. Step 604 of the method 600 can comprise transferring a desired design to a surface of the metallic plate, which can be done by any process known in the art. Step 606 of the method 600 can involve exposing the surface of the metallic plate to a flow of an acid till the transferred design is etched on the surface. The process in step 606 is known as acid etching, which can be carried out by flowing an acid over a metallic plate. The acid can include ferric chloride, hydrochloric acid, nitric acid, sulfuric acid, or any other suitable acid.

The duration the surface of the metallic plate is exposed to the flow of the acid determines the depth of the acid-etched design. The duration of the acid etching process can be controlled to achieve a desired depth of the acid-etched design, which is essential to get a properly stamped and embossed image with distinct lines. In fact, the acid etching process facilitates a combined creation of fine lines and embossing, which cannot be achieved in conventional rubber and polymer stamps or polypropylene plastic embossing folders.

In an embodiment, the method 600 can further include step 608 of applying a two-layer coating over the etched design. The first coat contains a metallic paint and is applied to the front and back surfaces of the acid-etched metallic die. The second coat contains a rubber paint and is applied over the metallic paint on both the front and back surfaces of the metallic die. The inner layer of metallic paint can facilitate the bonding of the rubber paint with the acid-etched surface of the metal plate. The outer layer of soft rubber paint is configured to absorb and store an ink and facilitate the transfer of the ink to a substrate on which the design is to be stamped.

In an aspect, the metallic die produced from the method 600 is configured to carry out a combination of two or more operations selected from: embossing, cutting, heat-foiling, stamping, scoring, and inserting patterns or designs in a plurality of substrates.

In an embodiment, the method 600 can further include the step of electrostatic spraying first a layer of the metallic paint and thereafter a layer of the rubber paint on the metallic plate by electrostatic spraying process. After spraying, the layers of sprayed paints can be subjected to curing at a predetermined elevated temperature for a selected time period. In one embodiment, the curing is conducted at between 150° C. to 190° C. for about 10 minutes to 30 minutes.

Thus, the present disclosure provides a metallic die that is produced by acid etching a metallic plate and thereafter coating with two layers of paint, a metallic paint followed by a rubber paint. The metallic die can be used individually or in combination with one or more other metallic dies in a die assembly to carry out a combination of two or more operations selected from: embossing, cutting, heat-foiling, stamping, scoring, and inserting patterns or designs in a plurality of substrates. Thus, the acid-etched metallic dies of the present invention overcome the drawbacks of the conventional dies used in the craft industry for different operations, which typically require a separate die for each operation and for stamping designs of different colors.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

We claim:

1. A method for making a metallic stamp and die, the method comprising the steps of:
providing a metallic plate;
transferring a predetermined design to a surface of the metallic plate;
exposing the surface of the metallic plate to an acid till the transferred design is etched on the surface; and
applying a two-layered coating on a front and back surface of the metallic plate, the two-layered coating comprising:
an inner layer of a metallic paint; and
an outer layer of a rubber paint, wherein the metallic paint is applied between the etched design and the rubber paint,
wherein the metallic stamp and die is configured for a combination of two or more crafting operations selected from the group consisting of: embossing, cutting, heat-foiling, stamping, scoring, and inserting a pattern or design on one or more substrates.

2. The method as claimed in claim 1, wherein the acid is selected from the group consisting of ferric chloride, hydrochloric acid, sulfuric acid, and nitric acid.

3. The method as claimed in claim 2, wherein the two-layered coating is cured at a predetermined elevated temperature.

4. The method as claimed in claim 3, wherein the predetermined elevated temperature ranges from 150° C. to 190° C.

5. The method as claimed in claim 3, wherein the two-layered coating is subjected to the predetermined elevated temperature for a selected time period.

6. The method as claimed in claim 5, wherein the selected time period ranges from 10 minutes to 30 minutes.

7. The method as claimed in claim 1, wherein the two-layered coating is applied by electrostatic spraying.

8. The method as claimed in claim 1, wherein the two-layered coating is applied by air spraying.

9. The method as claimed in claim 1, wherein the metallic plate is a carbon steel material.

10. The method as claimed in claim 1, wherein the metallic paint facilitates bonding of the rubber paint to the metallic stamp and die.

11. The method as claimed in claim 10, wherein the metallic paint comprises: N-butyl acetate; cellulose; acetate butanoate; and a resin.

12. The method as claimed in claim 1, wherein the rubber paint is configured to absorb and store an ink and facilitate transfer of the ink to the one or more substrates.

13. The method as claimed in claim 1, wherein the rubber paint comprises: a resin; N-butyl acetate; and 4-Methyl-2-pentanone.

* * * * *